United States Patent
Theisen et al.

(10) Patent No.: US 7,881,666 B2
(45) Date of Patent: Feb. 1, 2011

(54) AD-HOC COMMUNICATION NETWORK AND METHOD

(75) Inventors: Nanna Svane Theisen, Dragoer (DK); David J. Chater-Lea, Crowthrone (GB); Svend H. Frandsen, Praestoe (DK); Steen Petersen, Frederiksberg (DK)

(73) Assignee: Motorola, Inc., Schaumburg, IL (US)

( * ) Notice: Subject to any disclaimer, the term of this patent is extended or adjusted under 35 U.S.C. 154(b) by 1141 days.

(21) Appl. No.: 11/539,206

(22) Filed: Oct. 6, 2006

(65) Prior Publication Data

US 2007/0087759 A1 Apr. 19, 2007

(51) Int. Cl.
*H04B 7/00* (2006.01)

(52) U.S. Cl. ............... 455/41.2; 455/432.1; 455/432.3; 455/433; 455/436; 370/338

(58) Field of Classification Search ............... 455/41.1, 455/41.2, 432.1, 432.3, 433, 436, 440, 442, 455/456.1; 370/338
See application file for complete search history.

(56) References Cited

U.S. PATENT DOCUMENTS

| | | | | |
|---|---|---|---|---|
| 5,752,188 | A * | 5/1998 | Astrom et al. | 455/433 |
| 5,881,235 | A * | 3/1999 | Mills | 709/221 |
| 6,154,646 | A | 11/2000 | Tran et al. | |
| 6,427,076 | B2 * | 7/2002 | Skog | 455/433 |
| 6,850,760 | B2 * | 2/2005 | De Nicolas | 455/433 |
| 7,013,139 | B1 * | 3/2006 | Gan et al. | 455/432.3 |
| 7,027,417 | B1 * | 4/2006 | Verkama et al. | 370/329 |
| 7,031,700 | B1 * | 4/2006 | Weaver et al. | 455/420 |
| 7,502,361 | B2 * | 3/2009 | Ahmed et al. | 370/349 |
| 2002/0039907 | A1 * | 4/2002 | McKenna et al. | 455/517 |
| 2002/0058494 | A1 * | 5/2002 | Timonen et al. | 455/405 |
| 2004/0029601 | A1 * | 2/2004 | O'Neill et al. | 455/500 |

FOREIGN PATENT DOCUMENTS

| | | |
|---|---|---|
| DE | 4417779 C1 | 12/1995 |
| EP | 1251710 A1 | 10/2002 |
| WO | 9423506 A1 | 10/1994 |
| WO | 9927734 A1 | 6/1999 |
| WO | 0024216 A2 | 4/2000 |

OTHER PUBLICATIONS

Australian Application No. 2005239608—Office Action mailed Sep. 24, 2007—1 page.
Korean Application No. 10-2006-7022544—Notice of Patent Grant—1 page.
United Kingdom—GB Application No. 0409473.6—Certificate of Grant No. GB2413731—Nov. 2008—30 pages.
India Patent Office Application No. 5883/DELNP/2006—First Examination Report mailed Mar. 4, 2009—2 pages.
China Patent Office—Application No. 200580013498.4—First Office Action mailed Sep. 25, 2009—3 pages..
India Patent Office Application No. 5883/DELNP/2006—Patent Certificate—Granted Jan. 27, 2010—1 page.
EPC Search Report mailed Jan. 4, 2010—3 pages.

* cited by examiner

*Primary Examiner*—Tuan H Nguyen

(57) ABSTRACT

A method of controlling location information of subscribers (210, 212, 222) in a wireless, ad-hoc communications network (200). The network (200) comprises a plurality of nodes (204, 216, 226), wherein at least portion of said nodes are provided with Home Location Registers (HLRs) (206, 218, 228) and each of said nodes (204, 216, 226) has a Visitor Location Register (VLR) (208, 220, 230). When an operation of a first node (216) is to be reconfigured at least a part of records from a first HLR (218) assigned to said first node (216) are transferred to at least one of the other nodes (226) of the network (200).

4 Claims, 3 Drawing Sheets

100
-PRIOR ART-

AD-HOC COMMUNICATION NETWORK AND METHOD

FIELD OF THE INVENTION

The invention relates to a system and a method of controlling location information of subscribers and in particular, but not exclusively, controlling location information of subscribers in a TETRA (TErrestrial Trunked RAdio) cellular communication system.

BACKGROUND OF THE INVENTION

In a cellular communication system (like for example the Global System for Mobile communication (GSM) and TETRA (TErrestrial Trunked RAdio)), geographical region is divided into a number of cells each of which is served by a base station. One base station, also termed as Base Transceiver Station (BTS) with a switching infrastructure is referred as a node of the network. The switching infrastructure supporting BTS may be shared with other BTSs. The system infrastructure in a TETRA system is generally referred to as a switching and management infrastructure (SwMI), which substantially contains all of the communication elements apart from the MSs. This includes base transceiver stations (BTSs) connected to a conventional public-switched telephone network (PSTN) through base station controllers (BSCs) and mobile switching centres (MSCs). In geographical terms reference to a node is a reference to an area served by one BTS, and in network terms reference to a node is a reference to one BTS and supporting it infrastructure. A remote unit referred also as subscriber or mobile station (MS) or communication unit is served via a radio communication link by the base station of the cell within which the remote unit is operating.

One of the basic advantages of the cellular communications systems is that subscriber may move from one geographical location to another one while receiving services from the network. To provide seamless service there are regions of overlapping coverage of two base stations. As the subscriber moves from area served by a first base station towards area served by a second base station it enters the region of overlapping coverage. Within the region of overlapping coverage the subscriber changes the serving base station. This is known as cell reselection or handover.

The communication link from a BTS to a subscriber is generally referred to as a downlink communication channel. Conversely, the communication link from a subscriber to a BTS is generally referred to as an up-link communication channel.

To enable communication between two handsets operating in two different cells a fixed network interconnects the base stations. The fixed network is operable to route data between any two base stations and this way allows for communication between these two remote handsets. In addition, the fixed network may comprise gateway functions for interconnecting to external networks such as the Public Switched Telephone Network (PSTN). This allows subscribers to communicate with landline telephones and other communication terminals connected by a landline. Additionally the fixed network is adapted to perform functions required for managing a conventional cellular communication network including routing data, admission control, resource allocation, subscriber billing, mobile station authentication etc.

The TETRA communications system may be used as a public cellular communication system. However its main target group are organizations or groups such as emergency services. Special functions and services implemented in the TETRA system make this system especially suitable for services like police, emergency, fire rescue or others. One of such features provided by TETRA system, which is especially useful for the emergency services is controlling group calls as well as managing the membership of these groups. Other features and services provided by TETRA include, push-to-talk channel allocation, broadcast calls etc. In addition to trunked mode operation wherein remote units communicate via a base station, TETRA provides for the possibility of communication directly between remote units without participation of the infrastructure. This is known as Direct Mode Operation (DMO).

One of the important issues related to providing communications in cellular networks is mobility management. Main goal of the mobility management is providing and keeping up-to-date the infrastructure with information on location of the subscribers (i.e. in which cell particular subscriber is operating).

Static networks solve the problem by storing location and provisioning information in the HLR. Nodes on the network have tables indicating which HLR contains subscriber provisioning and location information.

Controlling location information of subscribers in static networks, known in the art, is outlined in FIG. i. In a static network 100, a first Home Location Register 118 assigned to a first node 116 contains all configuration data and location information of subscribers 122 and 112 home to the first node 116 and a third HLR 106 assigned to a third node 104 contains all configuration data and location information of subscriber 110. The location information stored in the first HLR 118 (and in any other HLR in the system, i.e. 106 and 128) is a dynamic pointer that can point to any Visitor Location Register (VLR) 108, 120, 130 in the network 100. A first VLR 120 (assigned to the first node 116) keeps information about all subscribers 122 active in a first cell 114 (serviced by the first node 116) and keeps pointers to respective HLRs (i.e. HLRs being home to the subscribers active in the first cell 114). In practice, configuration data of a first subscriber 122 and a second subscriber 112 is kept in the first HLR 118. The first HLR 118 keeps also information about location of the first subscriber 122 and the second subscriber 112, which is active in a third cell 102, and therefore points 132 to a third VLR 108. And the third VLR 108 points 134 to the first HLR 118 as there the configuration data of the second subscriber 112 is stored.

Mobility management scheme used in static networks cannot be implemented in ad-hoc networks, due to the fact that if the HLR function would be assigned to a node of the network, there would be a risk that data stored in that HLR are not be available when such a node is unreachable or even removed from the network at any specific time.

Current ad-hoc networks (i.e. networks which are adapted to be reconfigured during operations) use approaches where the subscribers' provisioning is either distributed replicated) throughout the network, or is contained in some fixed server that is accessed to provide service characteristics. Mobility is handled by ad hoc tables (e.g. the dynamic nature of IP routing tables) where every node in the network either discovers where to route calls for that mobile, or by accessing to the fixed server in a similar way to fixed network operation. If any of this methods cannot be used a scattergun paging is sent out to find location of the mobile.

When a node is moved the users, whose service or location information resides in that node, will either not get service or get a non-complete service from other sites (as their configuration data is not accessible anymore). They may also lose service until the network is updated and (re)configured to the new topology in terms of both location and provisioning information for users. The reconfiguration of the network can take relatively long period of time, and unknown locations may only be solved by widespread paging.

A need therefore exists for a method of controlling location information of subscribers in a communications network, particularly when the network is required to be operational irrespective of reconfiguration processes, wherein the above-mentioned disadvantages may be alleviated or overcome.

SUMMARY OF THE INVENTION

According to a first aspect of the present invention there is provided a method of controlling location information of subscribers in a wireless, ad-hoc communications network. The network comprises a plurality of nodes, wherein at least portion of said nodes are provided with Home Location Registers (HLRs) and each of said nodes has a Visitor Location Register (VLR). When an operation of a first node is to be reconfigured at least a part of records from a first HLR assigned to said first node are transferred to at least one of the other nodes of the network.

In one embodiment the operation of a first node is reconfigured by disconnecting said first node from the network.

In another embodiment the operation of a first node is reconfigured by physically moving the first node from one geographical location to another geographical location.

In yet another embodiment the operation of a first node is reconfigured by adding a new node to the network.

After reconfiguration of the operation of the first node and transfer of said at least part of the records of the first HLR, VLRs in the network are updated with information where the records from the first HLR are transferred to.

In one embodiment of said nodes has a look-up table, which identifies correct HLR for every subscriber operating in the network and said nodes update said look-up tables with the changes in the HLRs.

The transfer of the records from the first HLR is controlled by a control unit, wherein the at least one of said other nodes is selected from a predefined list or using a selection algorithm. The records from the first HLR are transferred, based on a selection algorithm, to a node connected with said first node. The records from the first HLR are transferred to a second node, wherein said second node is selected based on speed of the connection between said first and second nodes, or bit error rate on said connection, or bandwidth of said connection, or geographical location of the second node, or any combination of these factors. Said control unit creates a back-up copy of said first HLR and transfers said first HLR to said second node using said back-up copy if an error occurred during said transfer from said first node to said second node.

In one embodiment the records from the first HLR are transferred to a second node and no HLR is assigned to said second node before said transfer.

Alternatively said records of said first HLR are merged with records of a second HLR.

In yet another alternative embodiment said records of said first HLR are assigned to a second node as a separate HLR in addition to a second HLR that was assigned to said second node before said transfer.

In yet another alternative embodiment said records of said first HLR are split into at least two separate sets of records and said separate sets of records are transferred to separate nodes.

In yet another alternative embodiment said records of said first HLR are split into at least two separate sets of records and one of said separate sets of records stays with said first node and remaining sets of records are transferred to separate nodes.

According to a second aspect of the present invention there is provided a wireless ad-hoc communications network comprising a plurality of nodes, forming with other elements of the network a switching and management infrastructure (SwMI). The network comprises also a plurality of subscribers. At least portion of said nodes are provided with Home Location Registers (HLRs) and each of said nodes has a Visitor Location Register (VLR). In said network a first node is adapted to transfer at least a part of records from a first HLR assigned to said first node to at least one of the other nodes of the network and said at least one of the other nodes is adapted to accept said records. Said nodes are adapted to update said VLRs in the network with the information where the records from the first HLR are transferred to. In one embodiment each of said nodes of the communications network has a look-up table, which identifies correct HLR for every subscriber operating in the network and said nodes are adapted to update said look-up tables with the changes in the HLRs.

In one embodiment said network further contains a control unit adapted to control said transfer. Said control unit is adapted to create a back-up copy of said first HLR. Said control unit is further adapted to transfer said first HLR using said back-up copy if an error occurred during said transfer from said first node to at least one of the other nodes of the network.

In another embodiment, at least one of said nodes of said network is adapted to merge records of said first HLR with records of a HLR assigned to said at least one of said nodes of the communications network.

In yet another embodiment said nodes of said communications network are adapted to assign records of said first HLR to at least one of the other nodes of the network as a separate HLR in addition to a HLR that was assigned to said node before said transfer.

In yet another embodiment said nodes are adapted to assign records of said first HLR to a second node of the network as a second HLR and no HLR is assigned to said second node before said transfer.

The benefits of the present invention are:

The HLR is not static in its location, it can be moved around in the ad-hoc network as the network develops—thus ensuring that the network will always have continued access to the HLR configuration data for all users, even if the node holding their HLR is temporarily taken down or moved.

The location-track-keeping and the update of the HLR in an ad-hoc network is done automatically by the network when there is a change in network topology, thereby reducing the operating cost and making it more flexible in use.

It allows for easy implementation of a wireless system which is dynamic in nature and with better performance, while still ensuring service to the users.

The solution provides some aspects of a self-healing network.

BRIEF DESCRIPTION OF THE DRAWINGS

The present invention will be understood and appreciated more fully from the following detailed description taken in conjunction with the drawings in which.

DESCRIPTION OF AN EMBODIMENT OF THE INVENTION

The term "Home Location Register" (HLR) herein below refers to a database containing configuration information and location information related to all subscribers home to a particular node or nodes. One HLR may cover more than one node.

The term~Visitor Location Register" (VLR) herein below refers to a database containing information on subscribers operating in a particular node and keeps pointers to respective HLRs (i.e. HLRs that are home for the subscribers listed in the VLR). Every node in the network has assigned a separate VLR.

The term "look-up table" herein below refers to a table which is copied into every node and divides the individual and group address space into blocks of numbers, then allocates each block to one of the nodes, i.e. identifies the correct HLR for each block of identities. As every node has the same table, if a subscriber (or group member) registers at any node, that node can immediately know which node contains the HLR for that subscriber (or group).

The following description focuses on an embodiment of the invention applicable to a TETRA cellular communication system. However, it will be appreciated that the invention is not limited to this application but may be applied to many other communication systems.

Figure 1:
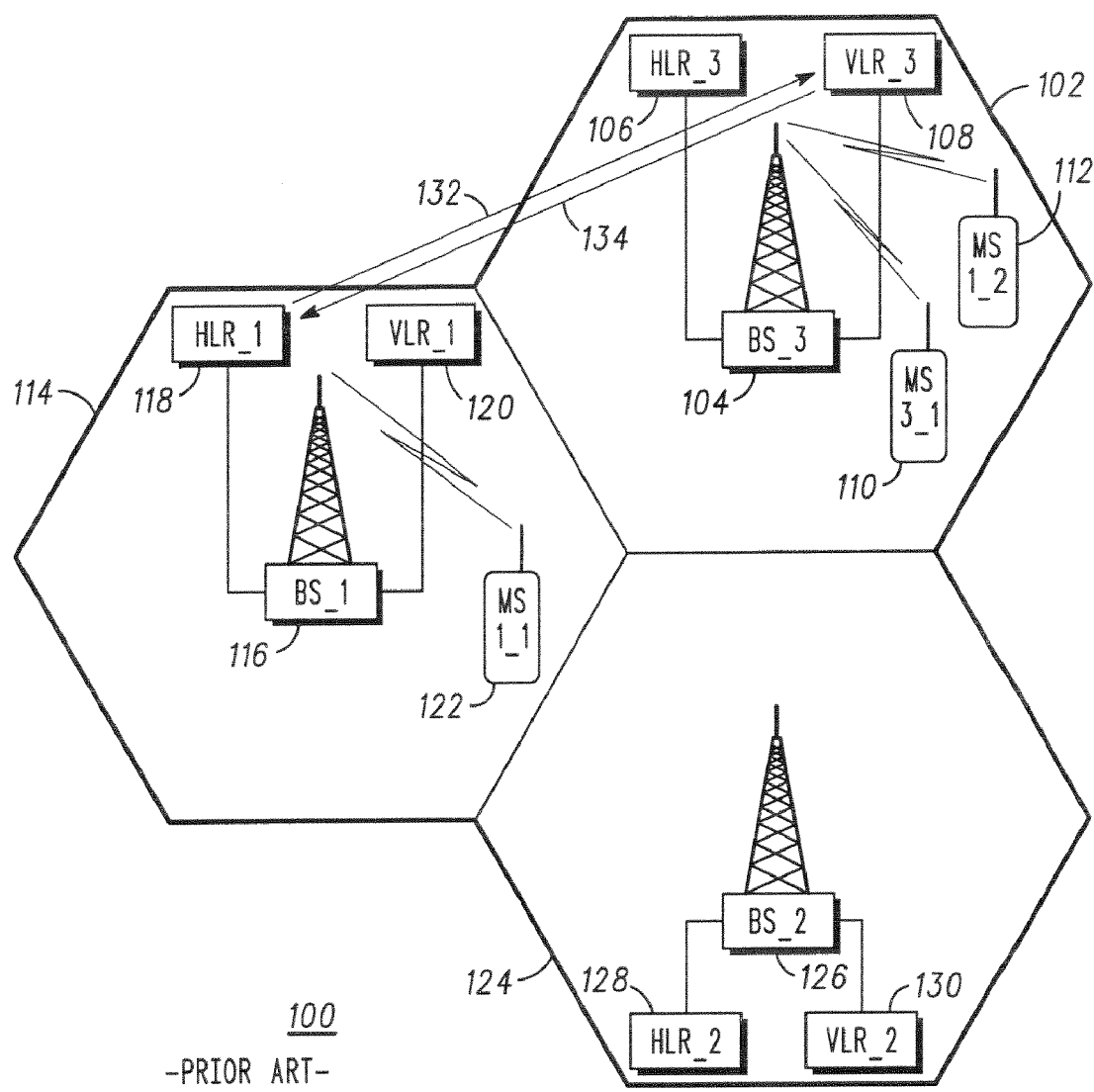
FIG. 1 is a diagram illustrating a method of controlling location information of subscribers in a wireless communication network known in the art.
Figure 2:
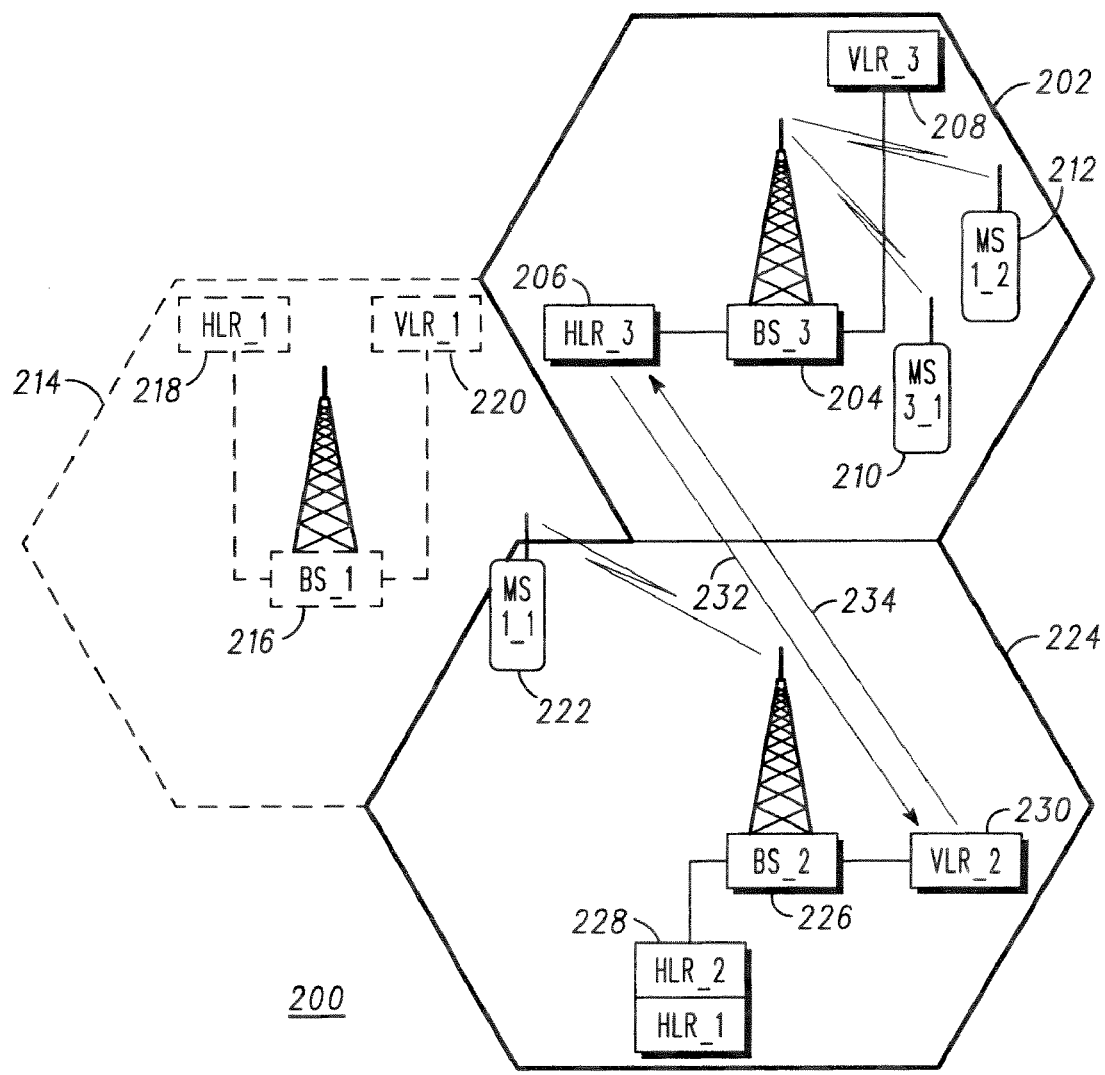
FIG. 2 is a diagram illustrating a method of controlling location information of subscribers in a wireless communication network in accordance with one embodiment of the present invention.
Figure 3:
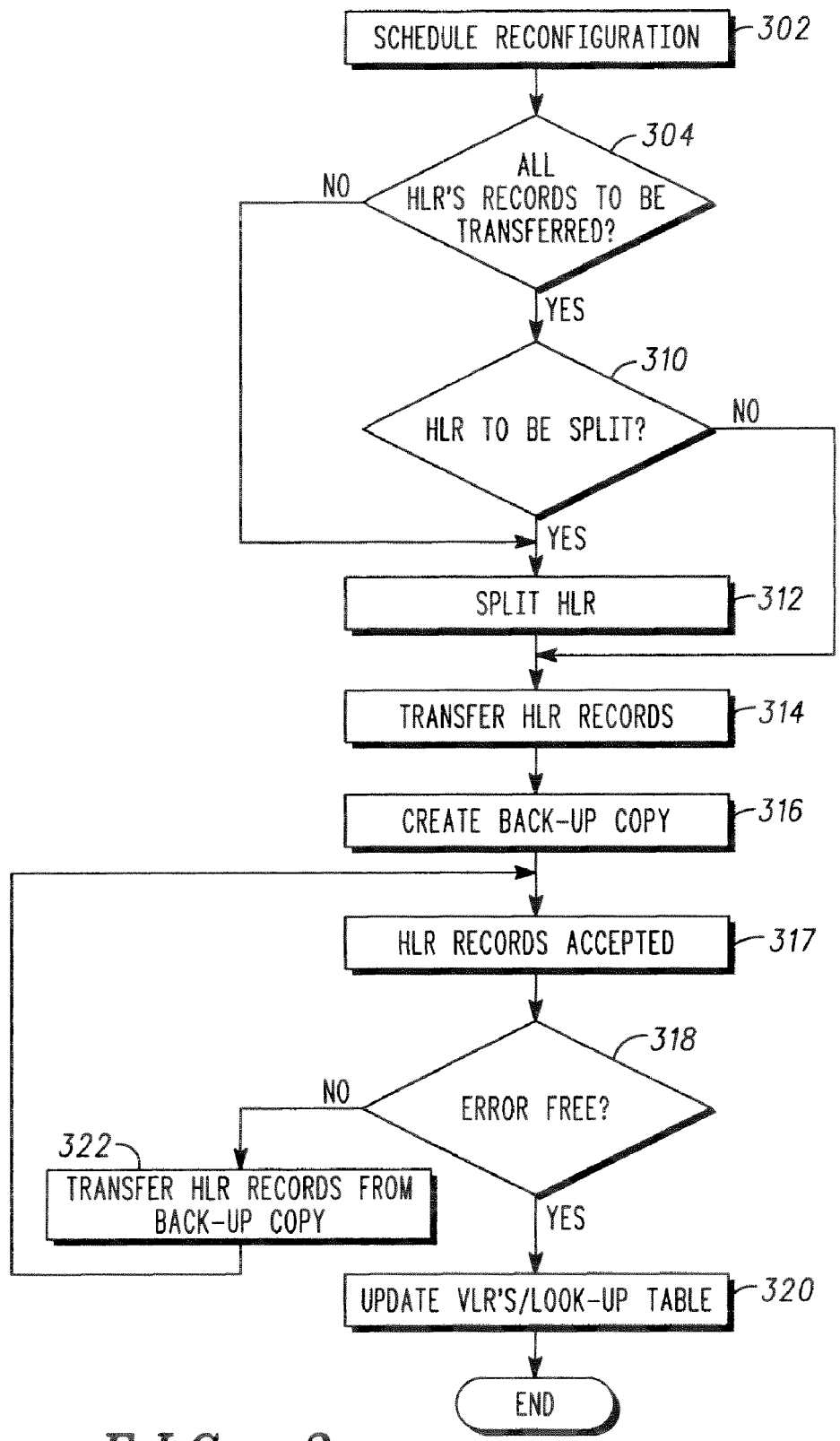
FIG. 3 is a flow chart illustrating a method of controlling location information of subscribers in a wireless communication network in accordance with one embodiment of the present invention.

Referring to FIG. 2 and FIG. 3 one embodiment of a method of controlling location information of subscribers 210, 212, 222 in a wireless, ad-hoc communications network 200 according to the present invention is shown. In a wireless, ad-hoc communications network 200, which comprises a plurality of nodes 204, 216, 226, at least portion of said nodes are provided with Home Location Registers (HLRs) 206, 218, 228. In addition each of said nodes 204, 216, 226 has a Visitor Location Register (VLR) 208, 220, 230. Ad-hoc network 200 may be reconfigured by for example disconnecting one of the nodes 204, 216, 226 from the network 200 or by physically moving one or more of the nodes 204, 216, 226 to a different geographical location, or by adding a new node to the network 200.

To ensure seamless operation of the ad-hoc network 200 all configuration and location data assigned a node affected by said reconfiguration must be available during and after said reconfiguration.

Depending on the type of the reconfiguration (disconnecting, moving, adding) either all or only a part of the records stored in a first HLR 218 is to be transferred to other node (or nodes) 304.

In one embodiment, if a first node 216 is to be disconnected from the network 200, all records stored in a first HLR 218 must be transferred 314 to other nodes. It may be accomplished by splitting 310, 312 the records of the first HLR 218 into at least two sets of records and then transferring 314 them to two other nodes of the network 200. Alternatively, if the first HLR 218 is not to be split 310 all records of the first HLR 218 are transferred 314 to another node of the network 200.

A result of transferring records from the first HLR 218 is change of home node of the subscribers 212, 222 from the first node 216 to a second node 226. It means that after disconnecting of the first node 216 configuration and location data of subscribers 212 and 222 are stored in a HLR 228 assigned to the second node 226. In consequence to have the network 200 fully operational all VLRs in the network 200 must be updated 320 with the new location of data previously stored in the first HLR 218. Otherwise they would point to HLR that does not exist.

Similarly the reconfiguration of the network and transferring of the first HLR 218 to a second node 226 modifies structure of a look-up table of the network. Look-up tables in the nodes of the network 200 are 15 updated 320 with information where the records from the first HLR 218 are transferred to.

In operation, reconfiguration of the network and transferring data from one HLR to another is extremely complicated. Failure in transfer may lead to disconnecting some of the subscribers from being serviced and this in turn may have fatal consequences if the system was used at that time in an emergency operation. To minimize the risk of failure a control unit, which is part of the switching and management infrastructure (SwMI) is added to the network 200. For the sake of clarity of the drawings the SwMI and the control unit are not depicted on the figures. The control unit is responsible for scheduling 302 and control of the transfer of the records of the first HLR 218 from the first node 216 to the second node 226.

In one embodiment the control unit selects the target node (the node to which the records from the first HLR 218 are to be transferred) using a predefined list. Alternatively the control unit may select the target node using a selection algorithm. Said algorithm is designed to optimize the transfer process. The criteria used for selecting target node can be for example a bandwidth of the link between the first node 216 and the target node, or a bit error rate of the communication channel between these two nodes, or speed of connection between these two nodes, or geographical location of the target node or any combination of these factors.

The control unit in one embodiment of the present invention may schedule the transfer 314 of the records from the first HLR 218 to a second node, wherein no HLR is assigned to said second node before said transfer.

Alternatively said records of said first HLR 218 are merged with records of the second HLR 228.

In yet another embodiment said records of said first HLR 218 are assigned to a second node as a separate HLR in addition to a second HLR that was assigned to said second node before said transfer. This solution is especially beneficial when said first node is temporarily disconnected from the network. Having two separate HLRs assigned to one node of the network it is possible to transfer back the first HLR (i.e. the HLR that was assigned to the first node before said reconfiguration).

After said transfer 314, the second node 226 confirms that the records have been received 317 and the second node 226 and the second HLR 228 check the received data against error 318. As the data are transferred in a form of computer readable file the check may be performed using known in the art a Cyclic Redundant Check (CRC) method. In another embodiment a checksum method can be used.

If an error has been detected 320 in the transferred records, the control unit initiates transfer of the records from a back-up copy 322. The back-up copy is created 316 by the control unit while the records are transferred from the first node 216 to the second HLR 228 assigned to the second node 226. Alternatively the back-up copy may be created during the step of scheduling 302 said reconfiguration.

When the records of the first HLR 218 are transferred without error all VLRs 208, 230 previously pointing to the first HLR 218 in the network 200 are updated with information where the records from the first HLR 218 are transferred to. Similarly the look-up tables in each nodes 204, 226 are updated with the correct HLR for all moved subscribers.

As it was mentioned above the reconfiguration of the network may be realized by disconnecting a node from the network. In another kind of reconfiguration is moving a node from one geographical location to another geographical location. As moving a node requires the node to be temporarily disconnected from the network the embodiment of the method for these two cases will the same (i.e. to ensure seamless operation of the network 200 all records stored in the HLR of node to be disconnected must be available for the subscribers and the SwMI after the reconfiguration). The third type of reconfiguration is adding new node to the network. In the simplest case it would not be necessary to transfer HLR's data from any of the nodes, but in some situations it can be beneficial to split 310, 312 the HLR assigned to one of the nodes and transfer one part of the split HLR to the newly added node. Splitting the HLR into two (or more) HLRs may be beneficial due to:

performance—it is not necessary to access a remote HLR;
resilience—if the link to the remote HLR goes down, there is still full service available;
gateway access—the HLR may be used to specify local gateway access, etc.

The method according to any one of preceding claims, wherein the records from the first HLR are transferred to a second node and no HLR is assigned to said second node before said transfer.

With reference to FIG. 2 one embodiment of a wireless, ad-hoc communications network 200 is presented. For the sake of clarity part of the network 200 affected by reconfiguration (disconnected from the network as depicted on FIG. 2) is drawn with dotted line. Said network 200 comprises a plurality of nodes 216, 204, 226, forming with other elements of the network a switching and management infrastructure (SwMI), and a plurality of subscribers 210, 212, 222 communicating with the nodes 216, 204, 226 on a radio communications channels. Communication from a remote unit to a base station is known as uplink, and communication from a base station to a remote unit is known as downlink. At least portion of said nodes are provided with Home Location Registers (HLRs) 218, 206, 228 and each of said nodes has a Visitor Location Register (VLR) 220, 208, 230. When said network 200 is to be reconfigured said first node 216 is adapted to transfer records from a first HLR 218 assigned to said first node 216 to a second node 226 and said second node 226 is adapted to accept said records.

In one embodiment the network 200 comprises a control unit which is adapted to control said transfer. The control unit may be implemented in form of software operating on one of the devices being a part of the SwMI. In another embodiment the control unit may be hardware implemented in a form of separate unit operably connected to the SwMI. One of the tasks performed by the control unit is selection of the target node (a node where the records from the first HLR 218 are transferred to). For said selection, the control unit in the simplest case may use a list of target nodes or it can be done using a selection algorithm. The criteria used by the algorithm are: a bandwidth or bit error rate of the connection between the first node 216 and the target node or a bit error rate of the communication channel between these two nodes, or speed of connection between these two nodes, or geographical location of the target node or any combination of these factors.

The control unit is adapted to create a back-up copy of said first HLR 218. This copy is stored on a mass storage device like for example computer hard disk. If in the transmitted records of the first HLR an error is detected, said control unit is adapted to transfer said first HLR 218 using said back-up copy.

When the transfer of the HLR's records is completed and no transfer errors are reported said nodes 204, 226 are adapted to update said VLRs 208, 230 in the network 200 with the information where the records from the first HLR 218 are transferred to.

In one embodiment the nodes 204, 216, 226 of the communications network 200 has a look-up table which lists all the subscribers operating in the network 200 and identifies the correct HLR for each of the subscribers. In consequence with reconfiguration of the network 200 and changing the structure of HLRs by transferring records of the first HLR 218 to the second node 226 it is necessary to update said look-up table with the new subscriber—HLR distribution.

The invention can be implemented in any suitable form including hardware, software, firmware or any combination of these. The elements and components of an Embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

What is claimed is:

1. A method of controlling location information of subscribers in a wireless, ad-hoc communications network comprising a plurality of nodes, wherein at least a portion of the nodes are provided with Home Location Registers (HLRs) and each of the nodes has a Visitor Location Register (VLR) the method comprising: when an operation of a first node is to be reconfigured, transferring at least a part of records from a first HLR assigned to the first node associated with a first base transceiver station to at least one of the other nodes associated with at least one of the other base transceiver stations of the network, wherein the records from the first HLR are transferred, to the at least one of the other nodes, as a second HLR associated with the at least one of the other nodes, further wherein a second node and no HLR is assigned to the at least one of the other nodes before the transfer, and wherein the at least one of the other nodes is selected based on one of a predefined list and a selection algorithm, and wherein the selection algorithm selects at least a second node based on at least one of the factors of speed of the connection between the first and second nodes, bit error rate on the connection, bandwidth of the connection, and geographical location of the second node.

2. The method according to claim 1, wherein reconfiguration comprises one of:
the first node being disconnected from the network and physically moved from one geographical location to another geographical location and reconnected to the network;
the first node being disconnected from the network without being reconnected to the network; and
a new node being added to the network without having been previously connected to the network.

3. The method according to claim 1 further comprising updating VLRs in the network with information of where the records from the first HLR are transferred.

4. The method according to claim 1, wherein each of the nodes has a look-up table, which identifies correct HLR for every subscriber operating in the network, the method further comprising the nodes updating the look-up tables with the changes in the HLRs.

* * * * *